United States Patent
Rousselin

(10) Patent No.: US 6,994,113 B2
(45) Date of Patent: Feb. 7, 2006

(54) CLOSING DEVICE FOR USE IN A VALVE DEVICE FOR A PRESSURIZED GAS CYLINDER

(75) Inventor: Guy Rousselin, La Saree (FR)

(73) Assignee: GCE SAS, La Charite sur Loire Cedex (FR)

( * ) Notice: Subject to any disclaimer, the term of this patent is extended or adjusted under 35 U.S.C. 154(b) by 0 days.

(21) Appl. No.: 10/339,641

(22) Filed: Jan. 10, 2003

(65) Prior Publication Data
US 2003/0150496 A1 Aug. 14, 2003

(30) Foreign Application Priority Data
Jan. 11, 2002 (FR) .................................. 02 00292

(51) Int. Cl.
*G05D 16/10* (2006.01)

(52) U.S. Cl. ...................................... 137/613; 251/285

(58) Field of Classification Search ................ 137/613, 137/322, 495, 505, 505.18; 251/285
See application file for complete search history.

(56) References Cited

U.S. PATENT DOCUMENTS

| 3,292,895 A | * | 12/1966 | Leger et al. ................... 251/83 |
| 4,402,340 A | | 9/1983 | Lockwood, Jr. |
| 5,033,499 A | * | 7/1991 | Patel et al. ............ 137/505.13 |

FOREIGN PATENT DOCUMENTS

| EP | 0 112 765 | 7/1984 |
| EP | 0 869 310 A1 | 10/1998 |

OTHER PUBLICATIONS

Japanese Patent Abstract No. 10159991, Publication Date Jun. 16, 1998.
Japanese Patent Abstract No. 06221450, Publication Date Aug. 9, 1994.

\* cited by examiner

*Primary Examiner*—Kevin Lee
(74) *Attorney, Agent, or Firm*—Lowe, Hauptman & Berner, LLP

(57) ABSTRACT

A device for closing a gas inlet in a valve device for a pressurized gas cylinder has a freedom of translation between an extreme gas inlet closing position and an open position at an extreme stop position or an intermediate position determined by the position of a component having translatory movement that can be adjusted by a handwheel.

15 Claims, 5 Drawing Sheets

FIG. 5b  A-A

CLOSING DEVICE FOR USE IN A VALVE DEVICE FOR A PRESSURIZED GAS CYLINDER

FIELD OF INVENTION

The present invention relates to a closing device for use particularly in a valve device for a pressurised gas cylinder. The present invention relates more particularly to a closing flap for a valve device with an integrated gas pressure regulator for a compressed oxygen cylinder intended particularly for use in oxygen therapy in a medical environment.

BACKGROUND ART

Valve devices for pressurised gas cylinders are known in the prior art. These valves generally comprise a control handwheel or button rotated by the user to control a flap closing the gas inlet. The flap is generally integral with the control handwheel via a gate valve stem. The flap is therefore very often rotated at the same time as the handwheel until it closes the gas inlet. The flaps generally comprise on their closing end a packing which is applied against the gas inlet seat. When the user screws the handwheel excessively in order to fully close the gate valve, the inlet duct seat tends to sink into the packing. When the user then wishes to open the gate valve, it may prove difficult to turn the control handwheel, given the fact that it sunk into the flap packing and therefore that multifarious friction exists between the flap and the duct seat.

An object of the invention is to provide a new and improved closing device for use in a gas valve device for overcoming the drawbacks of the prior art.

SUMMARY OF THE INVENTION

In accordance with one aspect of the invention, a device for closing a gas inlet for use in a valve device for a pressurised gas cylinder has a freedom of translation between an extreme gas inlet closing position and, for the opening of the gas inlet, an extreme stop position or an intermediate position determined by the position of a component having translatory movement that can be adjusted by the action of a handwheel.

Preferably, the intermediate position is determined by the component forming a so-called intermediate stop having movement controlled by the action of the handwheel.

According to another feature, the handwheel includes a control for the movement of the intermediate stop, including a gate valve stem integral with the handwheel.

In the prior art, given the fact that the seat sinks into the packing, separating the flap from the seat may also prove to be difficult.

The device also preferably includes a flap mounted on a spring and an arrangement for compressing the spring when the free end, the so-called second end, of the gate valve stem is bearing on the end opposite the flap closing end.

According to another feature, a first end of the gate valve stem is fixed to the handwheel, and a second end of the gate valve stem, forming the intermediate stop, is integral in rotation with the first end and free in translation relative to it. The second end of the gate valve stem is screwed into a body of a valve device. Rotation of the handwheel controls helical movement of the second end of the gate valve stem in the valve body.

Preferably, the first and second ends comprise complementary castellations (toothed wheels) making them integral with each other in rotation.

The first end is preferably connected to the second end by a spring that allows the translatory movement of the second end relative to the first end.

Preferably, the handwheel is rotated in both directions to drive the gate valve stem as the handwheel moves. The handwheel, in its rotational opening movement, controls, in a first part of its rotation, the opening of the gate valve to release the gas from the cylinder and, in a second part of its rotation, the setting of the flow of released gas to a valve outlet.

At least two orifices of different sizes preferably extend through the part forming a first end of the gate valve stem, and a third orifice extends in the valve body, which is connected to the gas outlet. The second part of the rotation of the control handwheel brings each of the two orifices opposite to each and the third orifice to control the gas outflow rate.

The gate valve, while open or closed, preferably comprises a holder which, when the handwheel is actuated, holds the handwheel at a constant projection relative to the valve body.

Preferably, the holder for the projection of the handwheel relative to the valve body comprises a stop to prevent the handwheel from moving inwards toward or outwards from the valve body.

The valve device preferably comprises a gas pressure reduction device that is downstream from the gas outlet gate valve of the cylinder.

Preferably, the valve device comprises, between the pressure reduction device and the gas outlet gate valve of the cylinder, a system of residual pressure below which a flap no longer allows gas to pass to the pressure reduction device.

The valve device preferably includes a manometer connected by a duct located upstream from the gas outlet gate valve for measuring the pressure in the gas cylinder.

Other features and advantages of the present invention will emerge more clearly from reading the description given below with reference to the appended drawing.

BRIEF DESCRIPTION OF THE DRAWING

FIG. 5*b* is a sectional view along line A—A in FIG. 5*a*.

DETAILED DESCRIPTION OF THE DRAWING

Figure 1:
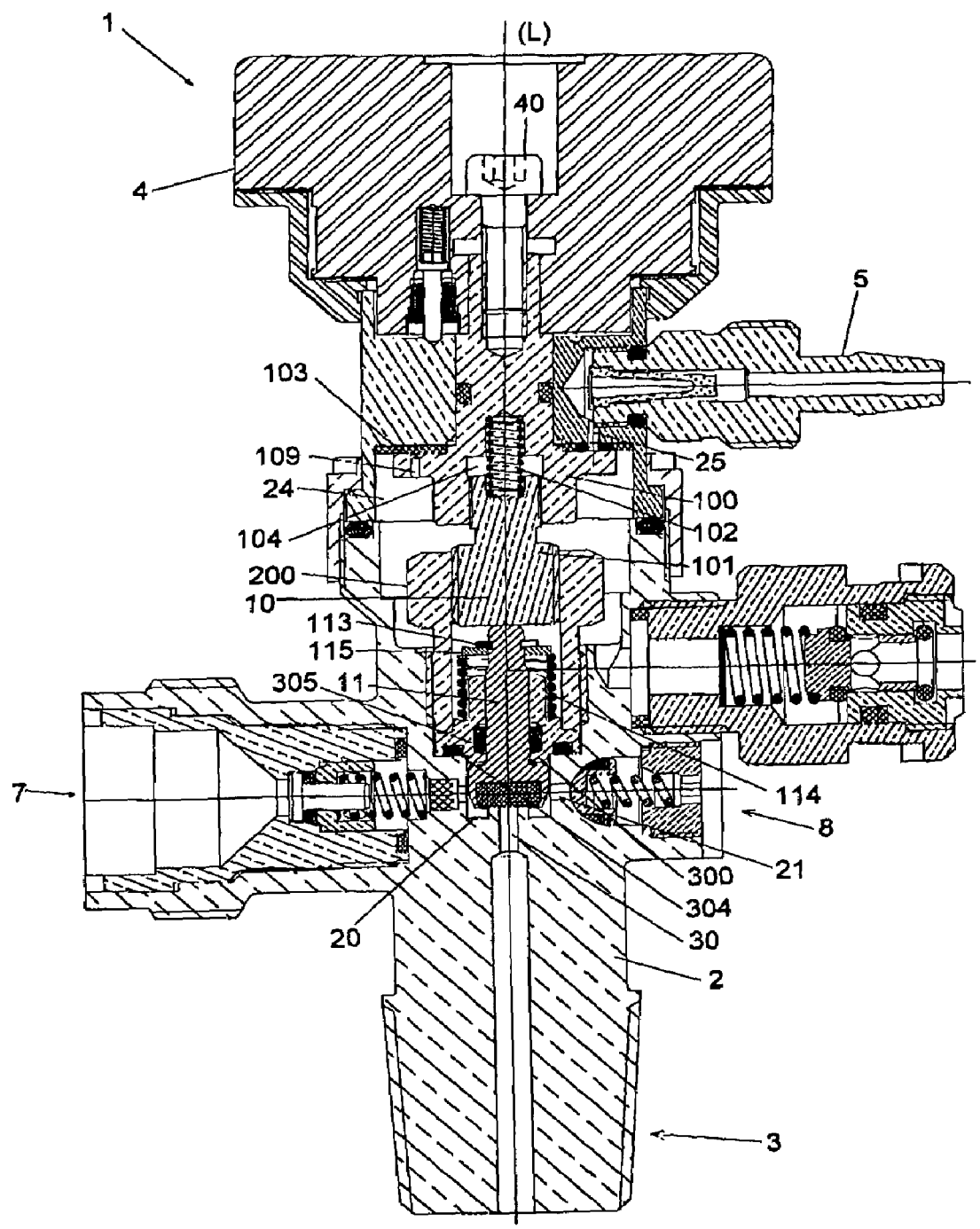
FIG. 1 is a side view in partial cross-section of a valve device according to a preferred embodiment of the invention.
Figure 2:
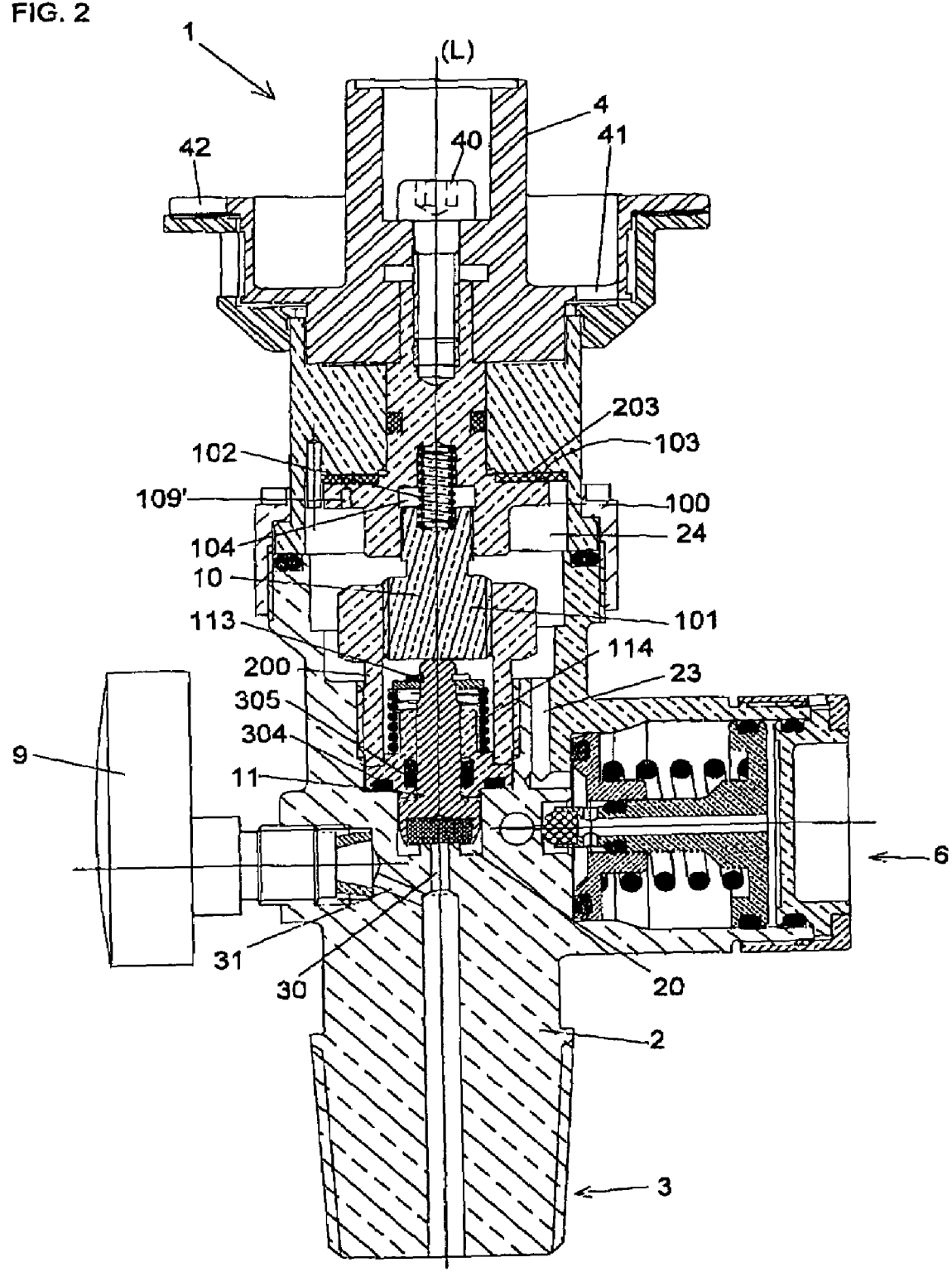
FIG. 2 is a side view in partial cross-section of the valve device of FIG. 1, along a plane perpendicular to that of FIG. 1.

The valve device (1, FIG. 1 and FIG. 2) includes a body (2) the lower part (3) of which is conical or approximately cylindrical and threaded so as to be mounted in a known way on an outlet orifice of a gas cylinder. The device (1) comprises on its upper part a handwheel (4) or button for controlling the opening and closing of the gate valve of the gases. This device (1) also comprises a delivered gas pressure reduction device (6) and an outlet (5) for the pressure-reduced gas of the device (1). By way of an example, the pressure reduction device (6) brings the gas, which is for example at a pressure of 200 bars in the cylinder, down to a pressure of about 3.5 bars. A filling orifice (7) is also provided on the body (2) of the device (1) in order to allow the gas cylinder to be filled.

Figure 5A:
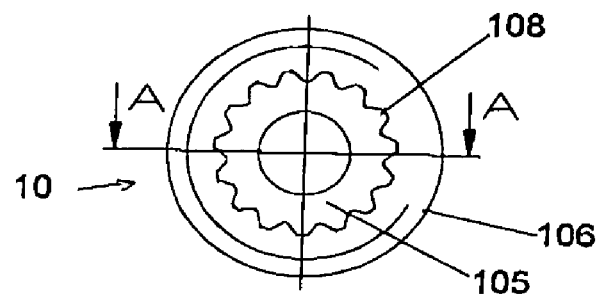
FIG. 5*a* is a top view of part of the gate valve stem of FIGS. 1–4.
Figure 6:
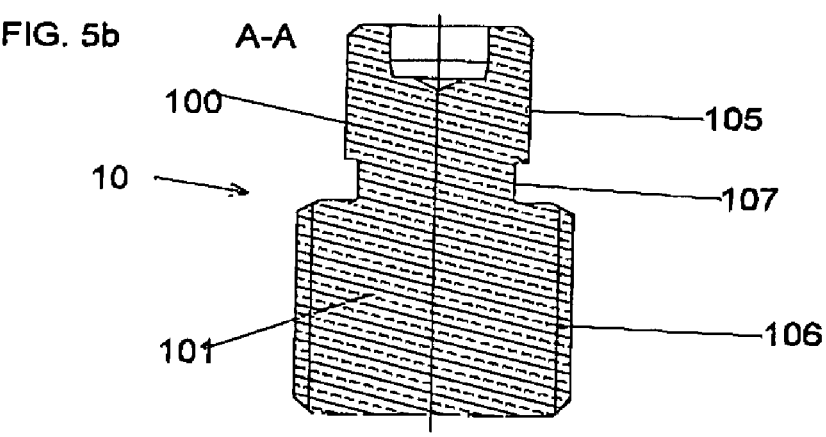
FIG. 6 is a longitudinal cross-sectional view of a flap for closing the gas inlet.
Figure 6:
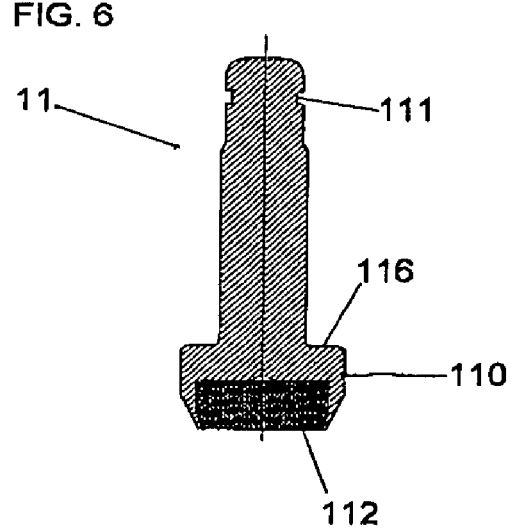

The control handwheel (4) or button, when it is activated, by rotation, controls, via a gate valve stem (10), the translatory movement of a mobile flap (11, FIG. 6) responsible for opening or closing the inlet (30) of gas coming from the cylinder. The gate valve stem (10) is composed of two parts (100, 101) connected by an elastic structure such as, for example, a spring (102). A first part (100) of the gate valve stem (10) is integral with the control handwheel (4). This first part (100) of the gate valve stem (10) is integral in rotation with the handwheel (4) by being tightened by one of its ends onto the handwheel, for example by a screw (40), the end of which is housed in this first part (100). This first part of the gate valve stem (10) is, under the action of the handwheel (4), free in rotation around its axis, merged with the longitudinal axis (L) of the device (1). This first part (100) is composed of a cylindrical body comprising a radial shoulder (103) bearing, under the action of the spring (102), against a seal (203) bearing also against the body (2) of the device (1). At the end opposite to the end where this first part (100) is fixed to the handwheel (4) there is formed, along the axis (L) of the device (1), a blind hole (104). At the bottom of this blind hole (104) is formed a recess at the bottom of which is fixed one end of the spring (102), its other end being integral with the second part (101) of the gate valve stem (10). This second part (101, FIGS. 5a and 5b) comprises on its so-called upper end a recess at the bottom of which is fixed the end of the spring (102). This second part (101) includes a cylindrical body the ends (105, 106) of which have different diameters. The diameter of the upper end (105) is smaller than that of the lower end (106) of this second part (101). These two ends are separated by a groove (107). A castellation (i.e., toothed wheel) (108, FIG. 5a) is formed, along the axis (L) of the device, on the outer surface of the upper end (105) of this second part (101). The castellated upper end (105) is intended to be housed in the blind hole (104) of the first part (100), the blind hole (104) being provided on its internal surface with a complementary castellation, these castellations making in rotation the first (100) and the second (101) parts of the gate valve stem (10) integral (i.e., abut) with each other.

Figure 7A:
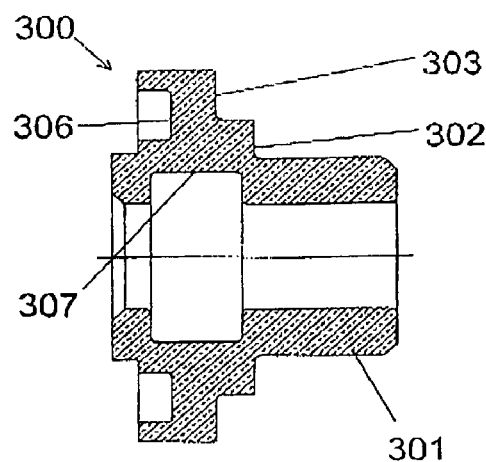
FIGS. 7*a* and 7*b* are longitudinal cross-sectional views, along two perpendicular planes of a gland used in the device of FIGS. 1–6, and FIGS. 8*a* and 8*b* are respectively a top view and a longitudinal cross-section of a gland nut used in the valve device of FIGS. 1–7.
Figure 7B:
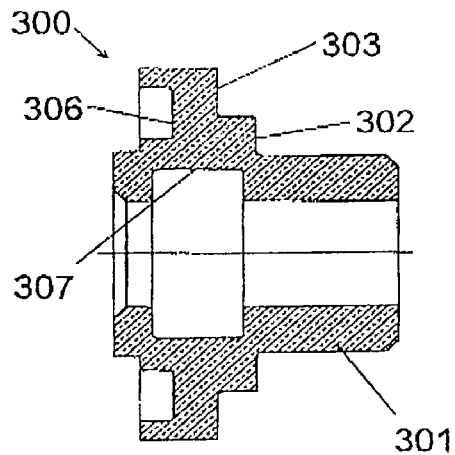
Figure 8A:
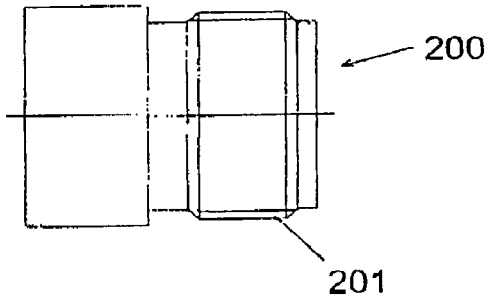
Figure 8B:
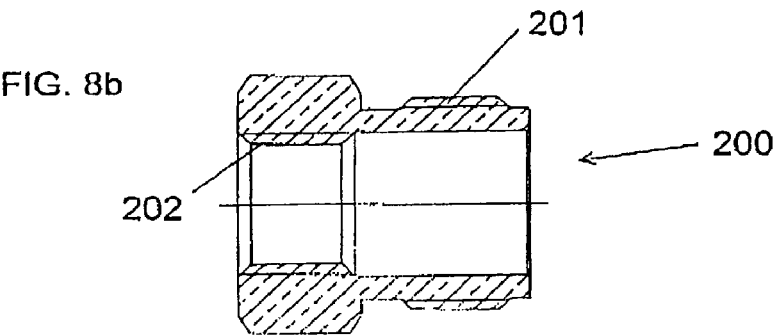

The lower end (106) of the second part (101) is threaded (109) on its external surface and is screwed onto the threaded portion (202) of a gland nut (200, FIGS. 8a and 8b) integral with the body (2) of the device (1). This nut (200) also comprises a threaded portion (201) on its external surface which is screwed into the body (2) of the device (1). The nut screwed into the body (2) of the device tightens a gland part (300, FIGS. 7a and 7b) against the body of the device (1). The nut (200) therefore has the dual function of (a) receiving the threaded lower end (106) of the second part (101) of the gate valve stem (10), and, being screwed onto the body (2) of the device, and (b) tightening the gland part (300). This part (300) is composed of a hollow cylindrical body (301) with a diameter smaller than the internal diameter of the nut (200), and comprises, at a certain distance from its upper end and from this end, two successive shoulders (302, 303), with increasing diameter. The nut (200) has its lower end screwed into the body (2) of the device which is bearing against the second shoulder (303) so as to bear the surface opposite the shoulder (303) against the body (2) of the device (1). The upper end of this part opens into the nut (200). The lower end of the body (301) of this part (300) is housed in a hole (20) formed in the body (2) of the device (1). At the bottom of this hole (20) is formed a seat onto which the gas inlet duct (30) of the gas cylinder opens. A duct (21, FIG. 1) opening into this hole (20) and leading to a residual pressure device is formed in the body (2) of the device (1). An annular groove (306, FIGS. 7a and 7b) is formed around the axis of the device (1) on the surface opposite the second shoulder (303). In this groove (306) is placed an O-ring (304, FIG. 1 and FIG. 2) responsible for creating a tight fit between the part (300) and the body (2) of the device (1). Another annular groove (307) is formed around the axis (L) of the device (1) on the internal surface of the part (300). An O-ring (305) is also placed in groove (307) to create the tight fit between the flap (11) and the part (300). The sealing O-rings (304, 305) make it possible to prevent propagation of high-pressure gas in the device (1) and mixing of high-pressure gas with pressure reduced gas. The flap (11, FIG. 6) is composed of a cylindrical rod, the axis of which is merged with the axis (L) of the device (1), comprising at its lower end a portion (110) of larger diameter forming a shoulder (116). The rod is introduced coaxially into the part (300) in order that its shoulder (116) can act as a stop against the lower face of the part (300). The lower face of the flap rod (11) is drilled with a blind hole in which is housed a cylindrical packing (112) of a thermoplastic material or of elastomer, crimped into the flap (11). In the gate valve closed position, this packing bears against the seat formed at the bottom of the hole (20). An annular groove (111) is formed around the axis (L) of the device (1) close to the upper end of the flap rod (11). In this groove (111) is placed a circlip (i.e., C-ring) (113). A spring (114) surrounds the body (301) of the part (300) and its lower end bears against the first shoulder (302) formed on the part (300). A washer (115) of diameter equivalent to the cross-section of the spring is placed between the upper end of the spring (114) and the circlip (113). The maximum clearance in translation of the flap (111) relative to the part (300) is very small, going from the bearing position of the lower face of the packing (112) of the flap (11) on the seat so as to close the gas inlet duct (30) to an open position in which the shoulder (116) of the flap is stopped against the lower face of the part (300).

In the gate valve closed position, the flap packing bears on the seat of the gas inlet duct (30). The flap is then in the low position. In this position, the upper end of the flap (11) is in straightforward contact with the lower face of the second part (101) of the gate valve stem (10) and depending on the screwing of the lower end (106) of the second part (101), the spring (114) surrounding the part (300) is more or less compressed.

When the control handwheel (4) is in the gate valve opening direction, the rotation of the gate valve stem (10) integral with the handwheel (4) causes the lower end (106) of the second part (101) of the gate valve stem (10) to unscrew and, therefore to rise up in the nut (200). Since the upper end of the flap (11) is, in the gate valve closed position, straightforwardly in contact with the lower face of the second part (101) of the gate valve stem (10), the action of the pressure of the gas present in the cylinder or the action of the spring (114) allows the flap which slides along the axis (L) of the device to rise up in the part (300). This sliding occurs until the shoulder (116) formed on the flap (11) is stopped against the lower face of the part (300) and/or until the upper end of the flap (11) is stopped against the lower end (106) of the second part (101) of the gate valve stem (10). The gas inlet duct (30) is no longer closed and the gas is able to leave the cylinder.

To close the gate valve, the user turns the handwheel in the other direction to screw the lower end (106) of the second part (101) of the gate valve stem so as to make it go down, and thus to bear on the upper end of the flap so as to push the flap (11). The flap packing (112) then closes the inlet duct (30) of the cylinder. Screwing may continue for example until the washer (115) bears against the upper face of the part (300). When the gate valve is being closed, the more the user bears against the flap, the more the spring (114) is compressed and the more the seat of the gas inlet duct (30) sinks into the flap packing (112). When the user wishes to open the gate valve, while the seat sinks well into the packing (112) of the flap (11), separating the packing (112) under the pressure of the highpressure gas alone may prove difficult. The spring (114), therefore, facilitates this separation by relaxing when translatory movement of the flap (11) is allowed, i.e., when the lower end of the first part (101) of the gate valve stem (10) is brought back up by a certain distance by being unscrewed from the nut (200).

The handwheel, when rotated to open or close, is in constant projection relative to the body (2) of the device (1). This is made possible by the spring (102) connecting the two parts (100, 101) of the gate valve stem (10). Indeed, when for example the lower end of the second part is being unscrewed in the nut (200), since the translatory movement of the first part (100) outwards from and inwards to the device (1) is locked, the second part (101) can be brought back up by compressing the spring (102). When the lower part of the second part is being screwed into the nut (200), the second part (101) can be taken down by unbending the spring (102) connecting the two parts (100, 101).

Figure 3:
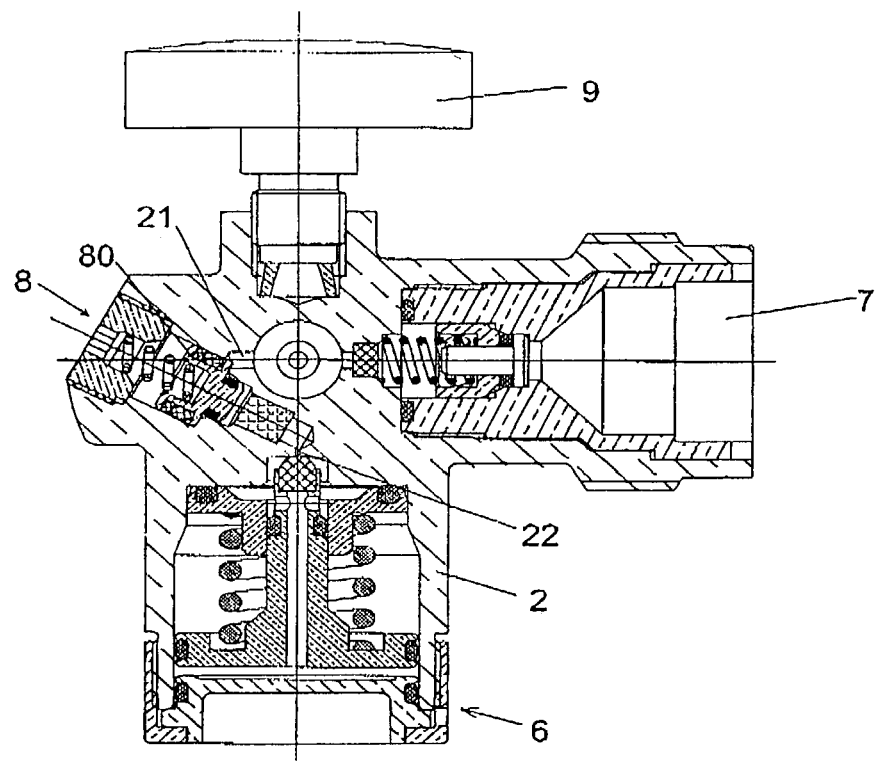
FIG. 3 is a top view in partial cross-section of the valve device along line A—A in FIGS. 1 and 2.

A first part of the rotation of the control handwheel (4) enables the high-pressure gas to be released from the gas cylinder. Once released, this gas passes through the duct (21) formed in the body (2) of the device and opening, for example into a residual pressure device (8). In a known way, such a device makes it possible never to completely empty the cylinder. Indeed, in the case of an oxygen cylinder for medical use, it is necessary to prevent contamination of the interior of the cylinder. To this end, the gas cylinder is maintained at pressure by always keeping a certain quantity of gas in it. For the user, the cylinder will appear to be empty whereas in reality it is not. In fact, there is always a certain quantity of pressurised gas in the cylinder. To this end, the device (8) integrated into the device (1) includes a flap (80, FIG. 3) mounted on a spring. When the gas arrives from the duct (21), the gas pressure pushes the flap (11) in order to get by. When there is only a very small amount of gas left in the cylinder, the gas pressure is no longer sufficient to push the flap (80) of the device (8). The gas no longer gets through and therefore remains in the cylinder. The spring, for example, has a rigidity constant defining the pressure, for example 3 or 4 bars, below which the flap (80) no longer moves in translation. This device (8) prevents the cylinder from being contaminated and it can then be filled through the filling orifice (7) without being cleaned.

Once the high-pressure gas has passed through the residual pressure device, a duct (22, FIG. 3) formed in the body (2) of the device (1) opens into the gas pressure reduction device (6). The gas pressure is then reduced.

Once the pressure is reduced, for example to 3 or 4 bars, the pressure-reduced gas joins via a duct (23, FIG. 2) a housing (24) formed in the body (2) of the device (1). From there, a second part of the rotation of the control handwheel (4) allows the gas to be released through the device outlet (5).

This second part of the rotation enables the outflow of the pressure-reduced gas to be adjusted. This flow is, for example, displayed on a specific window (41, FIG. 2 and FIG. 4) of the control handwheel (4).

Several orifices (109, 109') with different sizes are for example drilled along a circular arc, parallel to the axis (L) of the device (1), through the first part (100) of the gate valve stem (10) for example at the level of the radial shoulder (103) of this part. These orifices have different sizes, in other words they are of equal diameter but they each comprise a different open upper section. A duct (25, FIG. 1) is formed along the axis (L) of the device (1) in the body (2) of the device. Duct (25) opens onto the gas outlet (5). This duct (25) has a diameter at least equal to the largest of the higher cross-sections of the orifices (109, 109'). Opposite this duct (25), the sealing ring (FIG. 1), placed between the first part (100) of the gate valve stem (10) and the body (2) of the device, is also drilled with a corresponding orifice. As already described above, the first part of the rotation of the handwheel (4) makes it possible to open the gate valve and to release the high-pressure gas whose pressure is then reduced. The second part of the rotation brings opposite to each other one of the orifices (109, 109') formed through the first part (100) of the gate valve stem and the duct (25) formed in the body of the device (1). The pressure-reduced gas present in the housing (24) formed in the body of the device (1) can then pass in the oppositely located orifice (109, 109'), thence into the outlet duct (5). The handwheel includes, for example, stop cleats each placed to correspond with the position opposite an orifice (109, 109') relative to the duct (25), to each cleat also corresponding the inscription in the window (41, FIG. 4) which can be seen on the handwheel (41), of the flow adjusted by the orifice (109, 109') placed opposite the duct (25).

The gas inlet duct (30) in the cylinder includes a parallel duct (31) leading to a manometer (9) for measuring the pressure of the gas contained in the cylinder.

Figure 4:
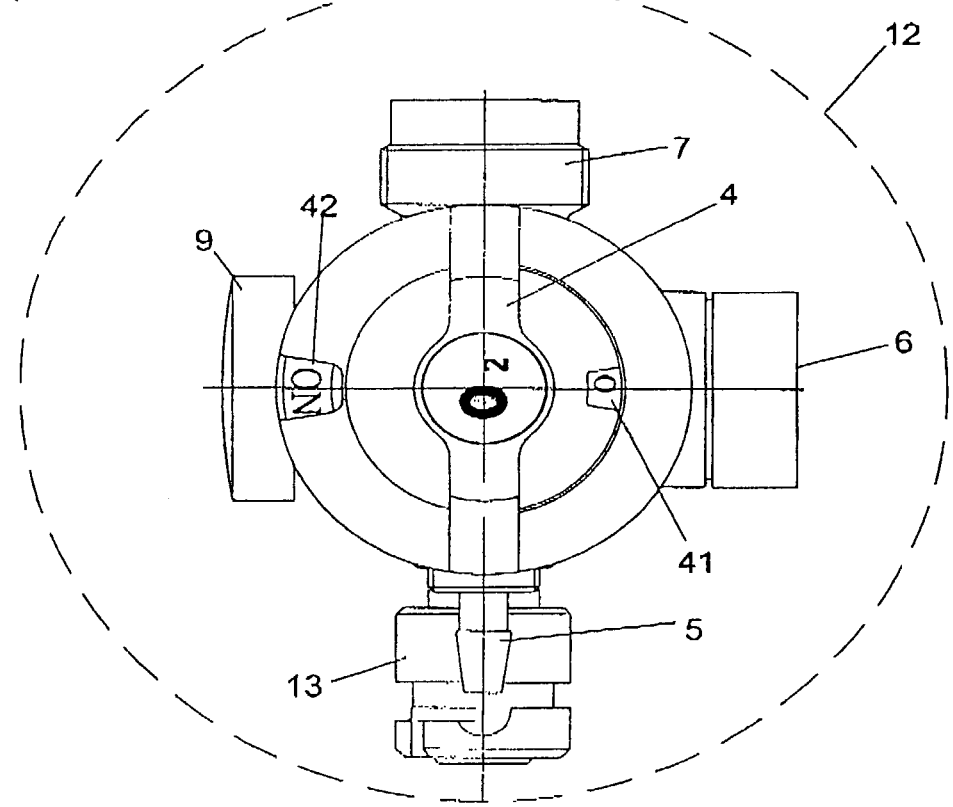
FIG. 4 is a front view of a valve control handwheel in the valve of FIGS. 1–3.

As illustrated in the top view of FIG. 4, the valve device (1) is connected to an oxygen cylinder (12) drawn in dotted lines. In this figure can be seen the manometer (9) used for measuring the pressure, the cylinder filling connector (7), the gas outlet connector (5), the pressure reduction device (6) and a quick connector (13) for connecting various accessories, placed just below the gas outlet connector (5). It is also possible to see a window (42, FIG. 2) in which it is shown whether or not the gate valve is open, and the window (41) displaying the flow.

It must be obvious for people skilled in the art that the present invention allows embodiments in a number of other specific forms without departing from the field of application of the invention as claimed. Consequently, the present embodiments must be considered as examples, but may be modified in the field defined by the scope of the appended claims, and the invention must not be limited to the details given above.

What is claimed is:

1. A gas inlet closing device for closing a gas inlet in a valve device for a pressurized gas cylinder, comprising: a structure for enabling the valve device to have a freedom of translation between an extreme gas inlet closing position and a gas inlet open position at an extreme stop position or an intermediate position determined by the position of a component having translatory movement which can be adjusted by the action of a handwheel;
- a cylindrical, rod-type mobile flap having a lower end for closing the inlet of as coming from the cylinder, said mobile flap being adapted to have a translatory movement;
- a part having a hollow cylindrical body for coaxially surrounding said flap;
- a spring disposed around said part that surrounds the flap, said spring having a first end engageable with a shoulder of said part and a second end extending beyond the upper end of said part; and
- a spring compressor including said flap for compressing said spring, said spring compressor being disposed in an upper end of the flap that extends beyond said part.

2. A gas inlet closing device according to claim 1, wherein the intermediate position is determined by a component forming an intermediate stop whose movement is controlled by the action of the handwheel.

3. A gas inlet closing device according to claim 2, wherein the handwheel includes a control for the movement of the intermediate stop, formed by a gate valve stem integral with the handwheel.

4. A gas inlet closing device according to claim 3, wherein the spring compressor is disposed at a first end of the spring, said spring compressor being arranged for compressing the spring in response to a free second end of the gate valve stem leaning on the end opposite the flap closing end, the gas inlet closing device further including a structure for opening the gas inlet comprising the second end of the gate valve stem not leaning on the end opposite the flap.

5. A gas inlet closing device according to claim 3, wherein the first end of the gate valve stem is fixed to the handwheel, a second end of the gate valve stem, forming the intermediate stop, being integral in rotation with the first end and free in translation relative to it, the second end of the gate valve stem being threadingly engaged with a body of a valve device, wherein rotation of the handwheel is adapted to control helical movement of the second end of the gate valve stem in the valve body.

6. A gas inlet closing device according to claim 5, wherein the two ends comprise complementary castellations causing them to be integral with each other in rotation.

7. A gas inlet closing device according to claim 5, wherein the first end is connected to the second end by a spring for allowing the translatory movement of the latter end relative to the first end.

8. A gas inlet closing device according to claim 5, wherein the handwheel is rotatable in both directions for driving the gate valve stem as the handwheel moves, the handwheel, in response to its rotational opening movement being arranged for controlling:
    (a) in a first part of the rotation, the opening of a gate valve to release the gas from the cylinder; and
    (b) in a second part of its rotation, a setting of the flow of released gas to a valve outlet.

9. A gas inlet closing device according to claim 5, wherein at least two orifices of different sizes extend through the part forming a first end of the gate valve stem, a third orifice extending in the valve body, the valve body being connected to the gas outlet, the second part of the rotation of the control handwheel being arranged to cause the two orifices and the third orifice to be opposite from one another to determine the gas outflow rate.

10. A gas inlet closing device according to claim 5, further comprising a gate valve that while in the open or closed position, comprises a holder which, when the handwheel is actuated, is adapted to cause the handwheel to be held in a constant projection relative to the valve body.

11. A gas inlet closing device according to claim 10, wherein the holder for the projection of the handwheel relative to the valve body comprises a stop arrangement for preventing the handwheel from moving inwards to or outwards from the valve body.

12. A gas inlet closing device according to claim 5, wherein the valve comprises a gas pressure reduction device located downstream from a gas outlet gate valve of the cylinder.

13. A gas inlet closing device according to claim 5, wherein the valve comprises a pressure reduction device and a system for providing residual pressure below which a flap no longer allows gas to pass to the pressure reduction device disposed between the pressure reduction device and the gas outlet gate valve of the cylinder.

14. A gas inlet closing device according to claim 5, wherein the valve device includes a manometer connected by a duct located upstream from the gas outlet gate valve for measuring the pressure in the gas cylinder.

15. A gas inlet closing device according to claim 1, wherein the lower end of said cylindrical rod-type mobile flap includes a shoulder for closing the inlet of gas coming from the cylinder, said part having a lower face forming a stop surface for said mobile flap shoulder in the extreme position of the gas inlet closing device for enabling opening of the inlet of gas.

* * * * *